United States Patent
Alishahi et al.

(10) Patent No.: US 11,652,556 B2
(45) Date of Patent: May 16, 2023

(54) OPTICAL MITIGATION OF INTER-CHANNEL CROSSTALK FOR WDM CHANNELS

(71) Applicant: University of Southern California, Los Angeles, CA (US)

(72) Inventors: Fatemeh Alishahi, Los Angeles, CA (US); Yinwen Cao, Los Angeles, CA (US); Ahmad Fallahpour, Los Angeles, CA (US); Amirhossein Mohajerin-Ariaei, Los Angeles, CA (US); Alan E. Willner, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 323 days.

(21) Appl. No.: 16/979,157

(22) PCT Filed: Mar. 8, 2019

(86) PCT No.: PCT/US2019/021371
§ 371 (c)(1),
(2) Date: Sep. 8, 2020

(87) PCT Pub. No.: WO2019/173727
PCT Pub. Date: Sep. 12, 2019

(65) Prior Publication Data
US 2020/0403712 A1   Dec. 24, 2020

Related U.S. Application Data

(60) Provisional application No. 62/641,171, filed on Mar. 9, 2018.

(51) Int. Cl.
*H04B 10/69* (2013.01)
*H04B 10/2543* (2013.01)
(Continued)

(52) U.S. Cl.
CPC ....... *H04B 10/697* (2013.01); *H04B 10/2543* (2013.01); *H04B 10/2557* (2013.01); *H04B 10/615* (2013.01); *H04J 14/0201* (2013.01)

(58) Field of Classification Search
CPC .............. H04B 10/697; H04B 10/2543; H04B 10/2557; H04B 10/615; H04J 14/0201
See application file for complete search history.

(56) References Cited

U.S. PATENT DOCUMENTS

| 8,699,882 B2 | 4/2014 | Shieh |
| 2003/0030865 A1 | 2/2003 | Yamada et al. |

(Continued)

FOREIGN PATENT DOCUMENTS

WO   2017015532 A1   1/2017

OTHER PUBLICATIONS

Ziyadi, "Reconfigurable High Speed Optical Signal Processing Using Optical Frequency Comb for High-Capacity, Spectrally Efficient Fiber Optic Systems and Networks" (Year: 2017).*

(Continued)

*Primary Examiner* — Casey L Kretzer
(74) *Attorney, Agent, or Firm* — Snell & Wilmer LLP (57) ABSTRACT

A method for all-optical reduction of inter-channel crosstalk for spectrally overlapped optical signals for maximizing utilization of an available spectrum includes receiving a plurality of spectrally overlapped optical signals modulated with data. The method further includes generating conjugate copies of each of the plurality of optical signals using non-linear optics. The method further includes selecting the conjugate copies and adjusting an amplitude, a phase, and a delay of the conjugate copies. The method further includes performing inter-channel interference (ICI) compensation on the spectrally overlapped optical signals in an optical (Continued)

domain by adding the adjusted conjugate copies to the spectrally overlapped optical signals.

15 Claims, 9 Drawing Sheets

(51) Int. Cl.
  *H04B 10/2557* (2013.01)
  *H04B 10/61* (2013.01)
  *H04J 14/02* (2006.01)

(56) References Cited

U.S. PATENT DOCUMENTS

| | | | |
|---|---|---|---|
| 2013/0070254 A1* | 3/2013 | Winzer | H04J 14/0201 356/477 |
| 2016/0080087 A1 | 3/2016 | Koike-Akino et al. | |
| 2017/0214558 A1 | 7/2017 | Nazarathy et al. | |

OTHER PUBLICATIONS

Cao et al, "Reconfigurable optical inter-channel interference mitigation for spectrally overlapped QPSK signals using nonlinear wave mixing in cascaded PPLN waveguides" (published in Optics Letters, vol. 41, No. 14, pp. 3233-3236, Jul. 2016) (Year: 2016).*

Cao et al, "Inter-channel interference mitigation of heterogeneous wavelength-overlapped channels of different baud rates and pulse shapes using nonlinear optical signal processing" (published in 2016 Conference on Lasers and Electro-Optics (CLEO), Jun. 2016) (Year: 2016).*

Cao et al, "Reconfigurable optical inter-channel interference compensation of 20/25-Gbaud QPSK signals using nonlinear wave mixing" (published in 2015 European Conference on Optical Communication (ECOC), Sep. 2015) (Year: 2015).*

International Search Report dated Jun. 25, 2019 in corresponding International Application No. PCT/US2019/021371 filed Mar. 8, 2019; total pp. 4.

Written Opinion of the International Searching Authority dated Jun. 25, 2019 in corresponding International Application No. PCT/US2019/021371 filed Mar. 8, 2019; total 4 pages.

* cited by examiner

OPTICAL MITIGATION OF INTER-CHANNEL CROSSTALK FOR WDM CHANNELS

CROSS-REFERENCE TO RELATED APPLICATIONS

This application is a U.S. National Stage entry under 35 U.S.C. § 371 of International Application No. PCT/US2019/021371 filed Mar. 8, 2019, which claims the benefit and priority of U.S. Provisional Application No. 62/641,171, entitled "OPTICAL MITIGATION OF INTER-CHANNEL CROSSTALK FOR WDM CHANNELS," filed on Mar. 9, 2018, which applications are hereby incorporated by reference in their entirety.

STATEMENT REGARDING GOVERNMENT RIGHTS

This invention was made with Government support under Contract No. 70NANB16H012, awarded by the National Institute of Standards and Technology (NIST); and with Government support under Contract No. Y501119, awarded by the National Science Foundation (NSF). The Government has certain rights in this invention.

BACKGROUND

1. Field

The present disclosure relates to systems and methods for reducing inter-channel crosstalk of overlapped optical signals that are received by a receiver in an optical communication system.

2. Description of the Related Art

Maximizing spectral efficiency, defined in terms of bits/sec/Hertz being transmitted within an available wavelength range of optical communication bandwidth, is a significant yet challenging task. To increase spectral efficiency the guard band between adjacent data channels can be reduced. An enhanced spectral efficiency can even be achieved by spectral overlapping of data channels. However, this method may give rise to increased inter-channel interference (ICI), thereby requiring effective compensation techniques to recover data.

There have been reports of different approaches to reduce ICI in spectrally overlapped wavelength division multiplexed (WDM) systems using electronic digital signal processing (DSP). Typical DSP schemes for ICI reduction include the individual detection of each wavelength channel across a WDM system. Common digital multichannel ICI compensation algorithms use the received information to estimate the channel spacing and reduce the crosstalk of each channel. The physical implementation of the DSP algorithm for ICI compensation usually requires a complex detection scheme that relies on multiple synchronized receivers or a single receiver with high bandwidth, undesirably resulting in high system cost and complexity.

Based on the above information, it may be desirable to mitigate inter-channel crosstalk using optical techniques, in which multichannel detection and channel spacing estimation are not necessarily required for ICI compensation of a single target channel.

SUMMARY

Described herein is a method for all-optical reduction of inter-channel crosstalk for spectrally overlapped optical signals for maximizing utilization of an available spectrum. The method includes receiving a plurality of spectrally overlapped optical signals modulated with data. The method further includes generating conjugate copies of each of the plurality of optical signals using non-linear optics. The method further includes selecting the conjugate copies and adjusting an amplitude, a phase, and a delay of the conjugate copies. The method further includes performing inter-channel interference (ICI) compensation on the spectrally overlapped optical signals in an optical domain by adding the adjusted conjugate copies to the spectrally overlapped optical signals.

Also disclosed is a method for reducing inter-channel crosstalk for optical signals. The method includes receiving a plurality of spectrally overlapped optical signals each carrying data on an optical bandwidth, the plurality of optical signals including odd signals interleaved with even signals. The method further includes generating a conjugate copy of the plurality of optical signals using non-linear optics. The method further includes performing, using two non-linear elements and two wavelength selective elements, inter-channel interference (ICI) compensation on all channels in the optical domain to reduce the inter-channel crosstalk using the conjugate copy of the plurality of optical signals.

Also disclosed is a system for reducing inter-channel crosstalk for optical signals. The system includes an overlapped optical wavelength division multiplexing (WDM) system including a plurality of optical signals including odd signals interleaved with even signals. The system further includes a first non-linear waveguide configured to generate a conjugate copy of the plurality of optical signals. The system further includes a first two-port programmable filter configured to divide and adjust the plurality of optical signals into two branches. The system further includes a second non-linear waveguide, a third non-linear waveguide, and a second programmable filter located downstream from the first two-port programmable filter in a first branch of the two branches and configured to perform inter-channel interference (ICI) compensation on the even signals in the optical domain to reduce the inter-channel crosstalk using the conjugate copy of the plurality of optical signals.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

DETAILED DESCRIPTION

The present disclosure discloses methods of performing optical inter-channel interference (ICI) compensation such that multiple spectrally overlapped wavelength-division multiplexing (WDM) channels can be recovered simultaneously. The present systems and methods optically mitigate inter-channel crosstalk of multiple spectrally overlapped channels of a WDM system within an individual element operating on multiple channels simultaneously. The ICI mitigation takes place in three stages of periodically poled lithium niobate (PPLN) waveguides.

In the first stage, the optical conjugates of the WDM channels may be constructed using a set of concurrent non-linear processes. The conjugate copies of the signals may be separated into two groups of even and odd channels. The amplitudes and phases of each channel in each group may be adjusted and coherently mixed with their adjacent crosstalk channels in the second-stage PPLN to mitigate the ICI. The conjugate copies may be delayed, and in a third stage PPLN, these conjugate copies may be mixed with the crosstalk signals to further decrease the ICI level. Experiments that were performed demonstrate operability of the system using seven spectrally overlapped 20 Gigabaud (Gbaud) quadrature phase shift keying (QPSK) or 16 quadrature amplitude modulation (QAM) channels. A nearly 4 decibel (dB) optical signal to noise ratio (OSNR) gain is achieved for QPSK data channels at a BER of $10^{-3}$. For the 16-QAM channels, the error vector magnitudes (EVMs) are reduced by almost 28 percent (28%) for a channel spacing of 17.5 Gigahertz (GHz).

Figure 1:
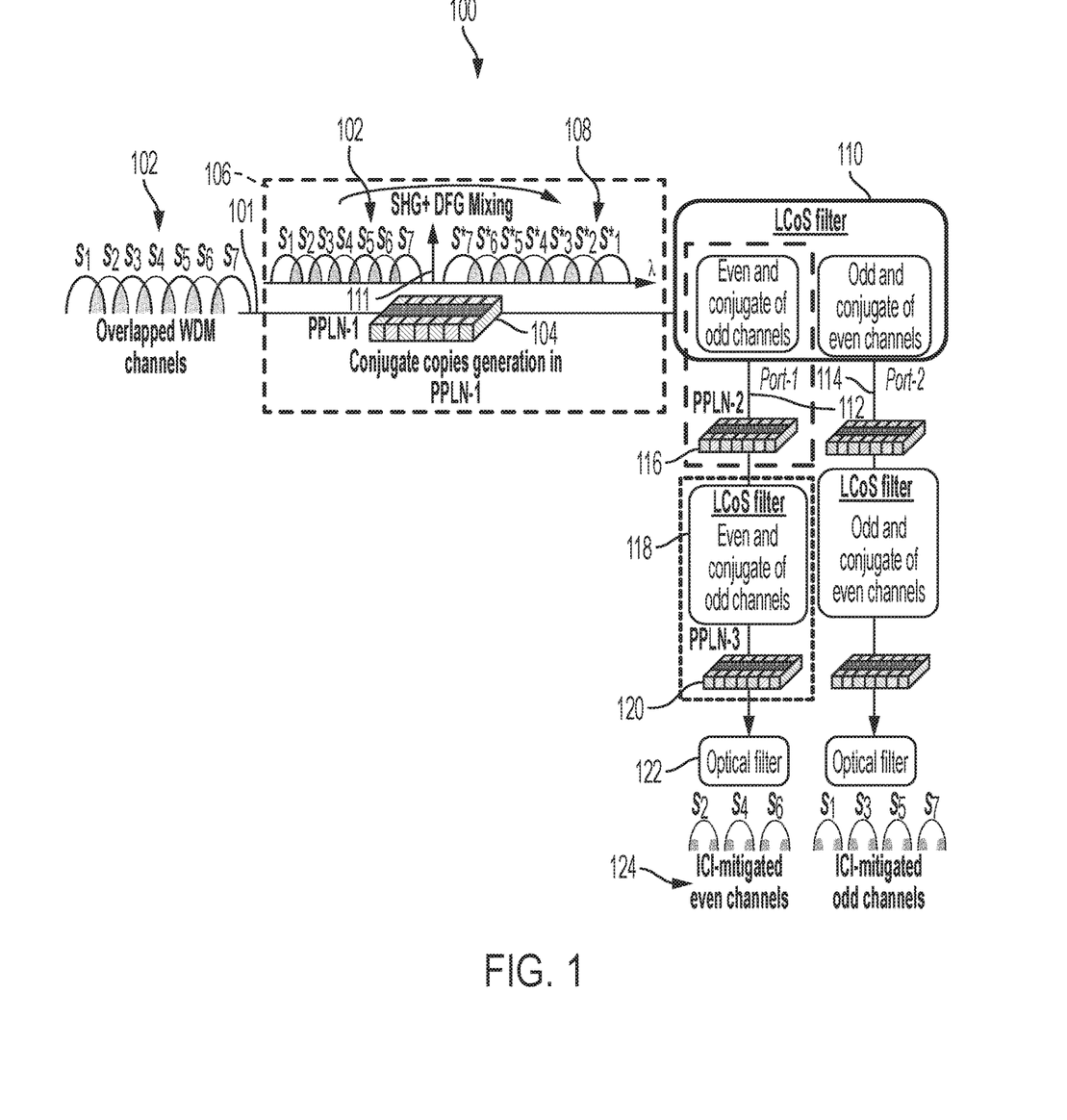
FIG. 1 is a block diagram illustrating a system for optical inter-channel crosstalk mitigation according to an embodiment of the present disclosure.

FIG. 1 illustrates a block diagram of a system 100 for performing optical ICI mitigation for multiple spectrally overlapped channels 102. The channels 102 may be referred to as signals, and the combination of channels 102 may be referred to as a wavelength division multiplexing (WDM) system 102. The system 100 may be included as part of an optical receiver that receives the overlapped channels 102 on a transmission line 101. For example, a transmitter (not shown) may transmit data on the transmission line 101 at the multiple overlapped channels 102, and the data may be extrapolated by components of the system 100 (e.g., at a receiver).

As depicted in FIG. 1, the incoming overlapped WDM channels 102 may be injected into a PPLN waveguide (PPLN-1) 104 which may be pumped by a continuous wave (CW) laser at a quasi-phase matching (QPM) wavelength. Inside PPLN-1 104 (as illustrated in block 106), through concurrent sum frequency generation (SFG) and difference frequency generation (DFG), the WDM channels 102 are wavelength-converted. That is, conjugate copies 108 of the WDM channels 102 at a symmetrical spectral location 111 with respect to the QPM wavelength are generated.

After the conjugate copies 108 of the WDM channels 102 are generated in block 106, the signals 102, 108 may be sent to a two-output-port optical programmable filter based on liquid crystal on silicon (LCoS) technology (LCoS filter 110). Odd and even channels may be separated at an output of the LCoS filter 110 and may be directed to different output paths. In the path following port 1 112 of the LCoS filter 110, the ICI of even channels may be mitigated, and in the path following port 2 114 of the LCoS filter 110, the ICI mitigation of odd channels may be performed. The LCoS filter 110 may output data along two branches. In that regard, the path following port 1 112 may be referred to as a first branch, and the path following port 2 114 may be referred to as a second branch. The present disclosure describes in detail the ICI mitigation for even channels (along the first branch or port 1 112). Similar actions may be performed for ICI mitigation of the odd channels without departing from the scope of the present disclosure.

Figure 2A:
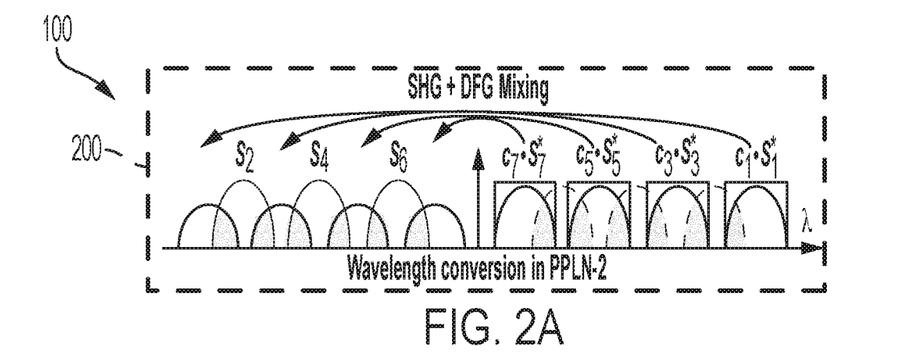
FIGS. 2A and 2B are frequency plots illustrating exemplary wavelengths of optical signals at various locations in the system of FIG. 1 according to an embodiment of the present disclosure.

At port 1 112 of the LCoS filter 110, even channels of the initial WDM channels 102 and odd channels of the conjugate copied channels 108 may be passed through. Simultaneously, the amplitudes and phases of the conjugate copies 108 of odd channels may be adjusted such that crosstalk suppression (to be performed in the next stage) is maximized. The following stage includes another PPLN waveguide (PPLN-2) 116, in which through the wavelength conversion, the original even channels and the twice-wavelength-converted odd channels are coherently added together. The output of the PPLN-2 116 is shown in a box 200 of FIG. 2A.

Next, through another LCoS filter (LCoS filter 2) 118, even channels in the original wavelength region and the odd channels of conjugate copies are selected. The amplitudes, phases, and delays of the conjugate copies are adjusted in the LCoS filter 2 118 to further mitigate the ICI of even channels, through wavelength conversion in a third PPLN (PPLN-3) 120. The output of the PPLN-3 is shown in a box 250 of FIG. 2B.

An optical filter 122 may filter the output from the PPLN-3. The output of the filter 122 may include ICI mitigated data 124 contained in even channels of the overlapped WDM channels 102.

Since the input WDM channels 102, the pump, and the conjugate copies 108 remain throughout the wavelength conversion processes, there is no need to precisely adjust the frequency spacing among channels, and coherent addition of the input signal and the wavelength converted signal becomes possible. Also, it should be mentioned that the system 100 utilizes PPLNs for three main reasons, although other non-linear elements may be used instead. First, a PPLN is utilized because of the relatively small size of the PPLN, there would be low latency or walk-off for propagating signals relative to highly non-linear fibers (HNLFs). Second, the relatively high conversion efficiency of PPLN potentially provides efficient non-linear mixing of the signals. Third, since PPLN has a $\chi(2)$-type non-linear response, the possible non-linear mixing processes are second harmonic generation (SHG), SFG, and DFG which were used in the present scheme. In a $\chi(3)$ medium such as a HNLF, more undesirable mixing terms may be produced. Therefore, PPLNs can be potentially used for the ICI mitigation of WDM channels with less crosstalk terms.

The mathematical representation of the system 100 is as follows. Consider three adjacent signals; $S_{i-1}$, $S_i$, and $S_{i+1}$.

Waveform Y represents the spectral combination of these three signals with a channel spacing of $\Delta f$ and is defined as follows in Equation 1.

$$Y(f) = S_{i-1}(f-\Delta f) + S_i(f) + S_{i+1}(f+\Delta f) \quad \text{Equation 1:}$$

Without loss of generality, it may be assumed that i is an even number. In this case i−1 and i+1 are odd and the first and third terms in the right side of Equation 1 are interference terms. In PPLN-1 104, waveform Y* is produced at a symmetrical wavelength position with respect to the CW pump as schematically plotted in the conjugate copy generation block 106 of FIG. 1. * may denote the complex conjugate of the respective variable. The two-output LCoS filter 110 (with the output illustrated in the box 200 of FIG. 2A) selects $S_i$, $S_{i-1}^*$, and $S_{i+1}^*$. The amplitudes and phases of $S_{i-1}^*$, and $S_{i+1}^*$ are adjusted through complex taps; $c_{i-1}$ and $c_{i+1}$ imposed by the LCoS filter 110. The signals at port 1 compose the adjusted signals $X_{i-1}$, $X_{i+1}$, and $Y_i$ and may be shown in follows in Equations 2-4.

$$Y_i(f) \propto \alpha_i(f) S_{i-1}(f-\Delta f) + S_i(f) + \alpha_i(f) S_{i+1}(f+\Delta f) \quad \text{Equation 2:}$$

$$X_{i-1}(f) \propto c_{i-1} S_{i-1}^*(f-\Delta f) + c_{i-1} \alpha_{i-1}^*(f) S_i(f)^* \quad \text{Equation 3:}$$

$$X_{i+1}(f) \propto c_{i+1} \alpha_{i+1}^*(f) S_i^*(f) + c_{i+1} S_{i+1}^*(f+\Delta f) \quad \text{Equation 4:}$$

In Equations 2-4, $\alpha_j^*(f)$, (j=i−1, i+1) denotes the filtering response of the optical programmable filter, centered at the central frequency of the signal $S_j^*$. Also, $\alpha_i(f)$ represents the filtering response of the optical programmable filter centered at the signal $S_i$. Since the channels are overlapped, the filtering responses affect the neighboring channels. Inside the box 200 of FIG. 2A, the signal $Y_i$ is mixed with signals $X_{i-1}^*$ and $X_{i+1}^*$. Additional terms may be obtained using an equation similar to Equation 5 below.

$$\tilde{Y}(f) = \gamma_{i-1} S_{i-1} d(f-\Delta f) + \gamma_i S_i(f) + \gamma_{i+1} S_{i+1}(f+\Delta f) \quad \text{Equation 5:}$$

In Equation 5, $\gamma_{i+1}(f) = \alpha_i(f) + c_{i-1}^*$, $\gamma_i(f) = 1 + c_{i-1}^* \alpha_{i-1}(f) + c_{i+1} \alpha_{i+1}(f)$, and $\gamma_{i+1}(f) = \alpha_i(f) + c_{i+1}^*$. The goal is to reduce the value of the crosstalk terms $S_{i-1}$ and $S_{i+1}$ through adjusting the coefficients $c_{i-1}$ and $c_{i+1}$. It should be noted that if the crosstalk terms are cancelled out completely, the tails of the main signal to survive would also be suppressed. Therefore, $c_{i-1}$ and $c_{i+1}$ are adjusted to minimize the coefficients of the crosstalk terms $S_{i-1}$ and $S_{i+1}$ and maximize the coefficient of $S_i$.

Figure 2B:
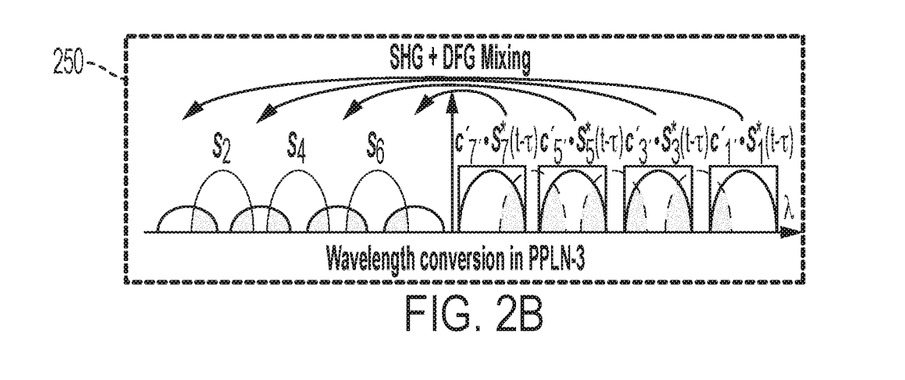

Furthermore, as demonstrated in the schematic spectrum inside box 250 of FIG. 2B (as performed by PPLN-3 120), signals $\gamma_{i-1} S_{i-1}^*$ and $\gamma_{i+1} S_{i+1}$ are selected at the output of the LCoS filter 2 118. The amplitudes and phases of $\gamma_{i-1}^* S_{i-1}^*$ and $\gamma_{i+1}^* S_{i+1}^*$ are adjusted with complex taps $c_{i-1}'$ and $c_{i+1}'$. Relative delays, $\tau_{i-1}$ and $\tau_{i+1}$, are also imposed on $\gamma_{i-1}^* S_{i-1}^*$ and $\gamma_{i+1}^* S_{i+1}^*$ by the LCoS filter 2 118. The adjusted signals may then be described as shown in Equations 6 and 7 below.

$$X_{i-1}'(f) \propto c_{i-1}' e^{j2\pi f\tau_{i-1}} \gamma_{i-1}^* S_{i-1}^*(f-\Delta f) + c_{i-1}' e^{j2\pi f\tau_{i-1}} \gamma_{i-1}^*(f) \alpha_{i-1}(f) S_i^*(f) \quad \text{Equation 6:}$$

$$X_{i+1}'(f) \propto c_{i+1}' e^{j2\pi f\tau_{i+1}} \gamma_{i+1}^* S_{i+1}^*(f+\Delta f) + c_{i+1}' e^{j2\pi f\tau_{i+1}} \gamma_{i+1}^*(f) \alpha_{i+1}(f) S_i^*(f) \quad \text{Equation 7:}$$

In the PPLN-3 120, $\tilde{Y}(f)$ is coherently mixed with signals $X_{i+}'^*$ and $X^{i-1'*}$. The resulting spectrum in the original spectral region, schematically depicted in box 250 of FIG. 2B, may be given in Equation 8 below.

$$\Psi(f) = \beta_{i-1} \gamma_{i-1} S_{i-1}(f-\Delta f) + \beta_i(f) \gamma_i(f) S_i(f) + \beta_{i+1} \gamma_{i+1} S_{i+1}(f+\Delta f) \quad \text{Equation 8:}$$

In Equation 8, $\beta_{i-1} = 1 + c_{i-1}'^* e^{-j2\pi f\tau_{i-1}}$, $\beta_i(f) = 1 + c_{i-1}'^* e^{-j2\pi f\tau_{i-1}} \alpha_{i-1} d^*(f) + c_{i+1}'^* e^{-j2\pi f\tau_{i+1}} \alpha_{i+1}^*(f)$, and $\beta_{i+1} = 1 + c_{i+1}'^* e^{-j2\pi f\tau_{i+1}}$. To mitigate the ICIs on channel $S_i$, the values of $c_j$, $c_j'$, and $T_j$ (j=i−1 or i+1) should be adjusted to have $\beta_{i-1}\gamma_{i-1}$ and $\beta_{i+1}\gamma_{i+1}$ relatively smaller compared to the coefficient of $S_i$, that is, $\beta_i(f)\gamma_i(f)$. In any case, the spectrum $\Psi(f)$ yields the ICI mitigation of channel $S_i$.

Figure 3:
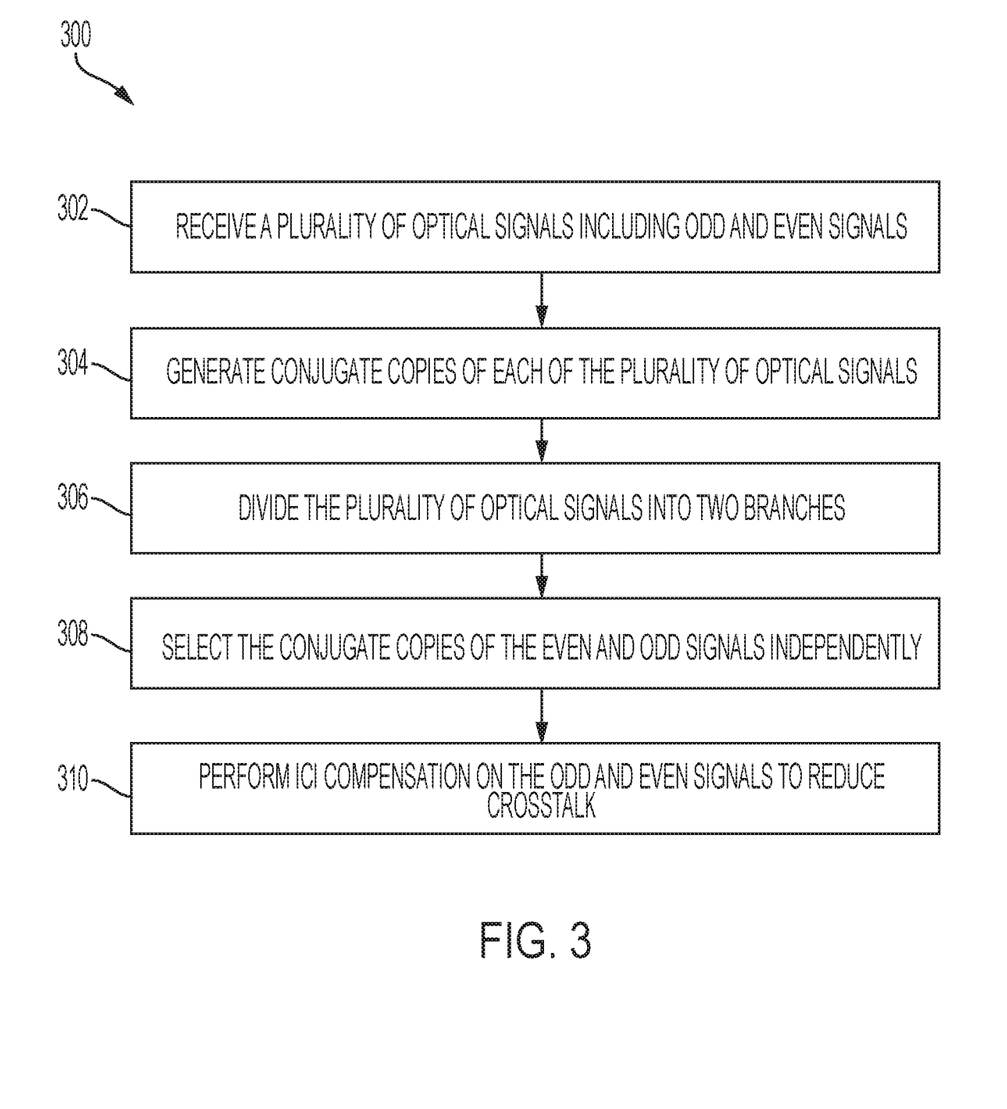
FIG. 3 is a flowchart illustrating a method for optical inter-channel crosstalk mitigation according to an embodiment of the present disclosure.

Referring now to FIG. 3, a method 300 for performing all-optical reduction of inter-channel crosstalk for optical signals for maximizing utilization of an available spectrum is shown. The method 300 may be performed, for example, by a system similar to the system 100 of FIG. 1 and may be performed by a component functioning as an optical receiver in an optical communication system.

In block 302, multiple optical signals or channels may be received by a receiver. The multiple channels may include multiple odd channels and multiple even channels, with even channels being located between, and overlapping with, adjacent odd channels.

In block 304, conjugate copies of each of the multiple optical channels may be generated. For example, the conjugate copies may be generated by a PPLN such as PPLN-1 104 of FIG. 1.

In block 306, the plurality of optical signals may be divided or split into two separate branches. For example, a first branch may correspond to the even channels and conjugate copies of the odd channels, and a second branch may correspond to the odd channels and conjugate copies of the even channels. A programmable filter, such as a LCoS filter (e.g., the LCoS filter 110 of FIG. 1), may be used to perform this division or splitting such that the first branch is output by a first port of the filter and the second branch is output by a second port of the filter.

In block 308, the conjugate copies of the even and odd signals may be selected independently. For example, a first programmable filter may be used to select the conjugate copies of the even channels to reduce crosstalk for the odd channels, and a second programmable filter may be used to select the conjugate copies of the odd channels to reduce crosstalk for the even channels.

In block 310, ICI compensation may be performed on the odd and even channels in the optical domain. For example, the ICI compensation may be performed using two non-linear waveguides by non-linear mixing, and by adjusting the channels using another programmable filter.

ICI mitigation, according to the present disclosure, avoids multi-channel detection and channel spacing estimation. Channel spacing estimation is not required because of all-optical wave mixing process which is frequency locked. Multi-channel detection is expensive and complicated. Opposing to previous methods for crosstalk reduction, the method 300 of FIG. 3 fails to require the detection of signals other than the desired target channel to reduce crosstalk.

Figure 4:
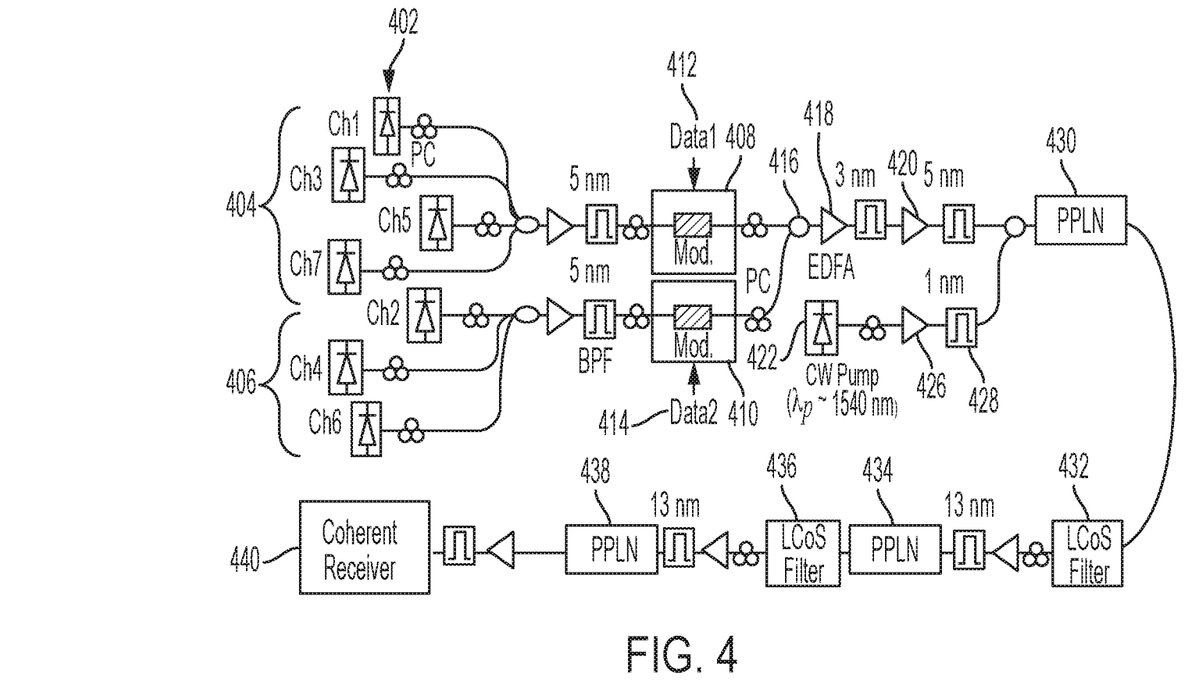
FIG. 4 is a block diagram illustrating an experimental system for testing the system of FIG. 1 and the method of FIG. 3 according to an embodiment of the present disclosure.
Figure 5A:
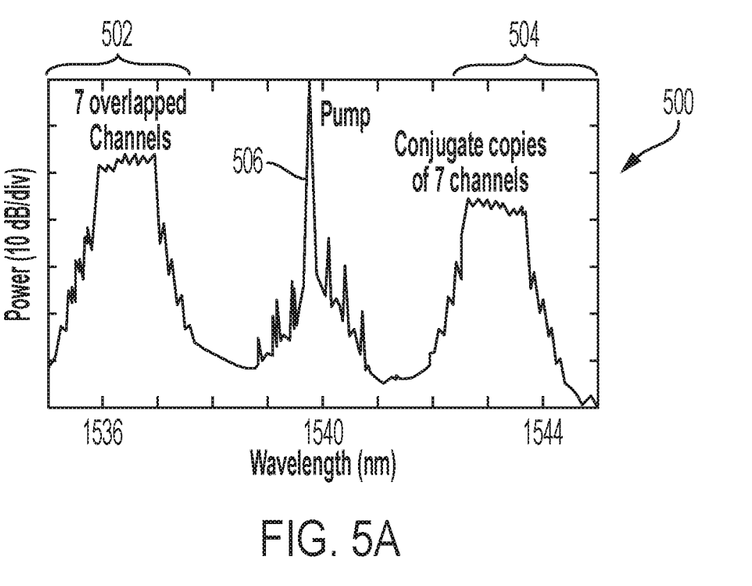
FIGS. 5A and 5B are frequency plots illustrating various signals in the experimental system of FIG. 4 according to an embodiment of the present disclosure.

FIG. 4 illustrates an experimental system 400 to demonstrate operability of the system 100 of FIG. 1, and may operate based on a method similar to the method 300 of FIG. 3. Seven tunable narrow-linewidth laser sources 402 may be clustered in two groups 404, 406 to emulate the odd and even channels, respectively. The even and odd channels are created by two I/Q modulators 408, 410 with independent data streams 412, 414. A pseudo-random bit pattern (PRBS) generator with pattern length of $2^{15} - 1$ and not-return-to-zero (NRZ) pulses are used to generate the data streams 412, 414. To overlap the WDM channels, the optical frequencies of these seven channels are chosen so that their difference, $\Delta f$, is smaller than the baud rate of the data. The polarization of each signal channel is independently tuned to be aligned with the principal axis of the MZM modulator. The odd and even channels may be combined using a 50/50 coupler 416. Optical signals may be amplified using two stages of erbium-doped fiber amplifiers (EDFAs) 418, 420 and mixed with a CW pump laser 422 at about 1540 nanometers (nm). Before being combined, the CW pump laser 422 may be amplified by an amplifier 424 to about 22 dBm using an EDFA 426 followed by a tunable 1 nm filter 428. The optical signals and the CW pump laser signal are sent into a first PPLN waveguide 440 to generate the conjugate copies of the signals. FIG. 5A illustrates a plot 500 showing the results of this conjugate copy generation; the plot 500 illustrates the original signals 502 along with the conjugate copies 504 and the wavelength 506 of the CW pump laser 422.

The QPM wavelength of the PPLN waveguide 440 may be temperature tuned and stabilized around the wavelength of the CW pump laser 422. This allows for the maximum conversion efficiency of the SHG and DFG processes inside the PPLN waveguide 440.

Figure 5B:
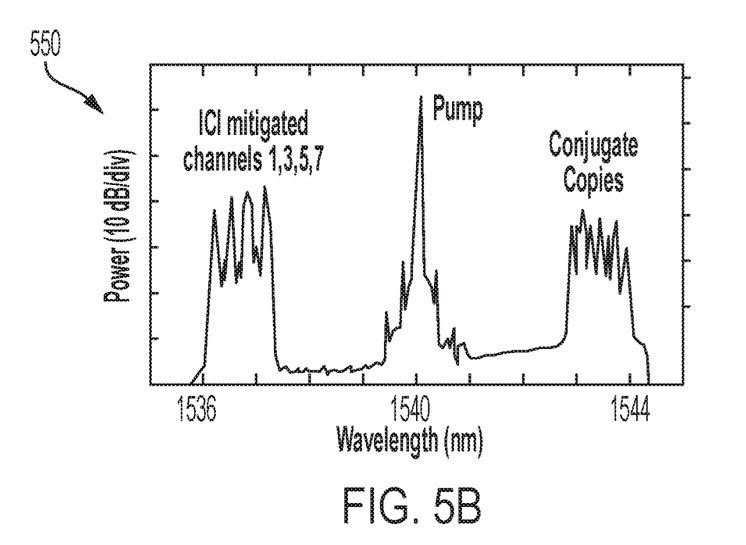

The signals, the conjugate copies, and the pump may be sent to a spatial light modulator (SLM) filter 442 having two-output ports. The SLM filter 442 may be based on LCoS technology, in which the odd and even conjugate copies based on target channel selections for ICI mitigation of either odd or even channels are selected, and the amplitudes and phases of the signals and the conjugates are adjusted. Note that to mitigate the ICIs of even (odd) channels, the odd (even) signals from the generated conjugate copies and the original even (odd) channels are selected. The adjusted signals, the conjugates, and the CW pump signal may be amplified to approximately 21 dBm and sent into a second PPLN waveguide 434 with a similar QPM wavelength as the first PPLN waveguide 440. In this second PPLN waveguide 434, the signals may be mixed with amplitude-adjusted and phase-adjusted crosstalk channels to reduce the ICI. By using another LCoS filter 436, the amplitudes and phases of the conjugate copies may be adjusted. In this second LCoS filter 436, the conjugate copies may be further delayed and sent to another PPLN waveguide 438 along the original target channels for ICI mitigation. Inside this PPLN waveguide 438, the signals and delayed variants of the crosstalk neighboring signals may be mixed to further mitigate the ICIs. FIG. 5B illustrates a plot 550 showing the output of the PPLN waveguide 438 in the optical spectrum.

In each of the above steps, it is unnecessary to estimate the channel spacing because the pump and signals are preserved throughout the non-linear processes. Channel spacing remains unchanged throughout each non-linear interaction. The ICI mitigated channels may be filtered and sent into a coherent detector 340 to record the constellation diagrams and measure the BER. For offline DSP, frequency offset and phase noise compensation may be used. Adaptive equalization was avoided in DSP algorithms in order to be able to observe the performance of the proposed scheme for optical IC mitigation.

Figure 6:
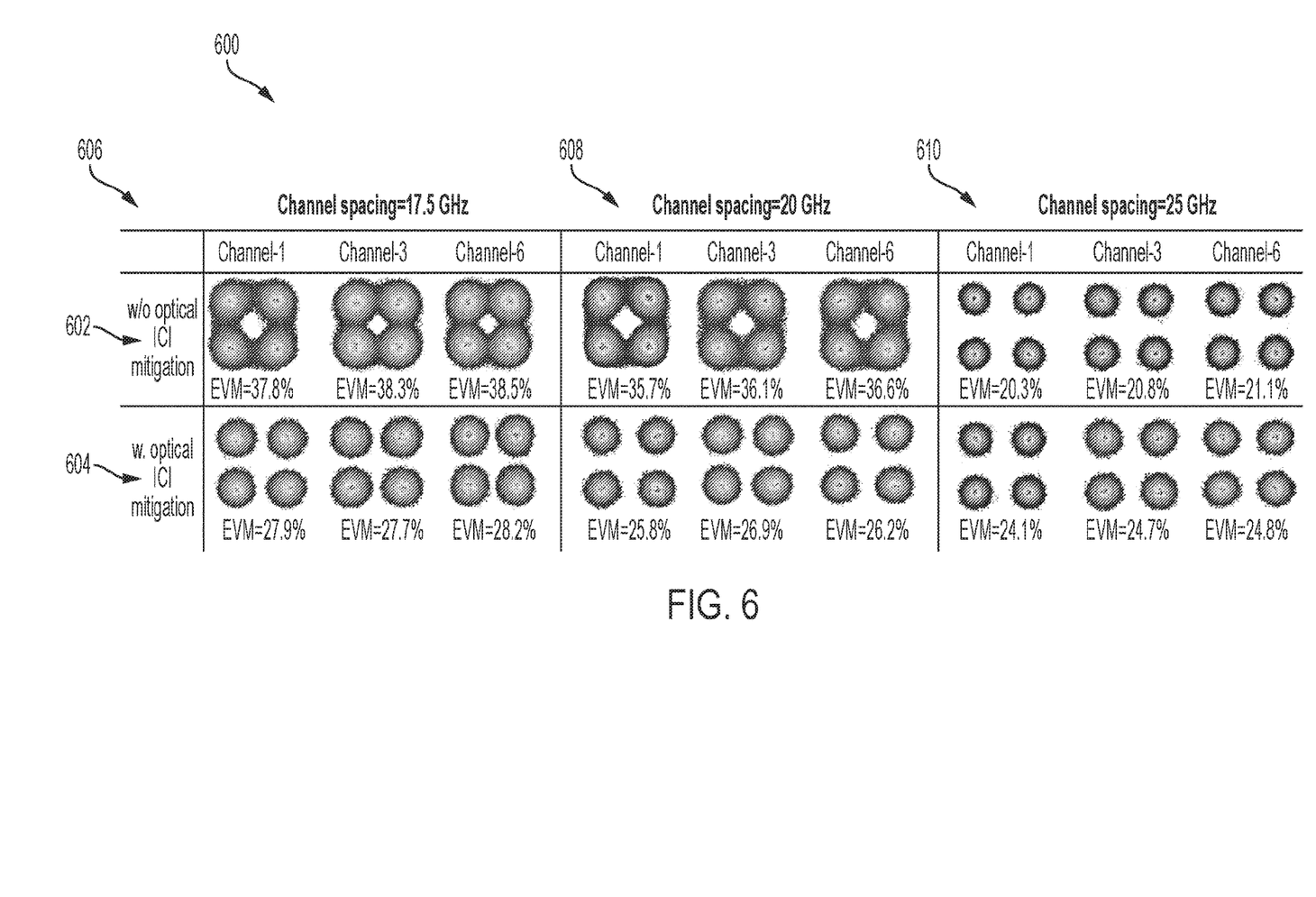
FIG. 6 shows constellation diagrams illustrating resulting outputs of the experimental system of FIG. 4 using QPSK signals according to an embodiment of the present disclosure.

FIG. 6 illustrates constellation diagrams 600 of channels 1, 3, and 6 of the experimental setup of FIG. 4 in various situations, with the seven lasers of the experimental setup of FIG. 4 being first modulated by two independent electrical QPSK data streams. The constellations are measured (i) without optical ICI mitigation (back to back, as shown in a row 602) and (ii) with optical ICI mitigation (as shown in a row 604). To achieve the constellation diagrams for the ICI-mitigated signals, the coefficients $c_i$ and $c_i'$ and delays are manually tuned by monitoring the received error vector magnitude (EVM).

The channels are modulated with 20 Gbaud signals, and experiments are run for three different values for channel spacing: 17.5 GHz (shown in a column 606), 20 GHz (shown in a column 608), and 25 GHz (shown in a column 610). The ICI mitigation method provides negligible benefit when the channel spacing is larger than the baud rate of the signals, which is acceptable because the ICI effect there is insignificant ($\Delta f=25$ GHz in column 610). When the channel spacing is equal to or less than the signal baud rate, the ICI is significant, and the ICI mitigation on the proposed method becomes noticeable ($\Delta f=20$ GHz (column 608) and 17.5 GHz (column 606)).

For all three channel spacings, the ICI mitigations for the odd channel (channel 3) shows similar performance as for the even channel (channel 6). Note that both channels 3 and 6 incur two crosstalk terms from two neighboring channels. The slightly lower EVMs for channel 1, which incurs just one interference term, can be attributed to a lower power of this channel as demonstrated in the spectrum of FIG. 5A.

Figure 7:
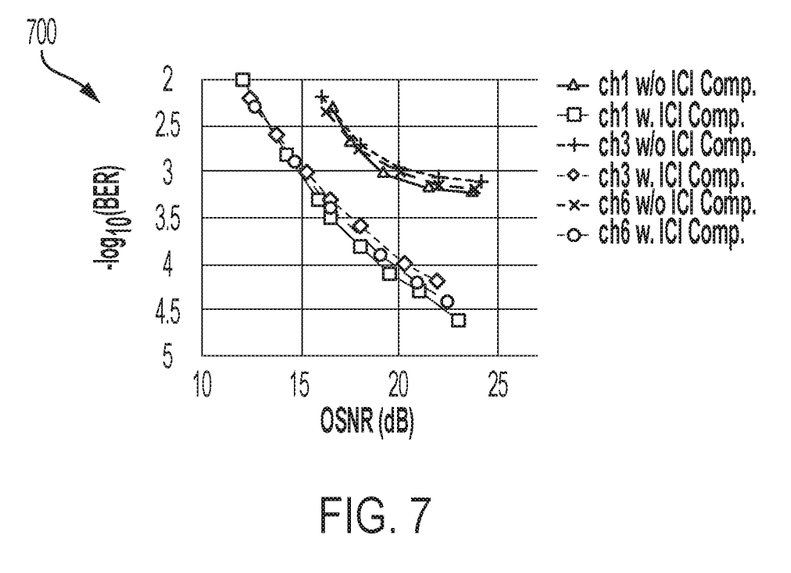
FIG. 7 is a graph illustrating bit error rate of the resulting outputs of the experimental system of FIG. 4 using QPSK signals according to an embodiment of the present disclosure.

FIG. 7 is a graph 700 illustrating BER versus optical signal-to-noise ratio OSNR results for channels 1, 3, and 6 carrying 20 Gbaud QPSK signals and with the channel spacing of 17.5 GHz. For a QPSK channel with channel spacing of 17.5 GHz, the required OSNR to achieve a BER of $10^{-3}$ is reduced by approximately 4 dB after optical ICI mitigation.

Figure 8:
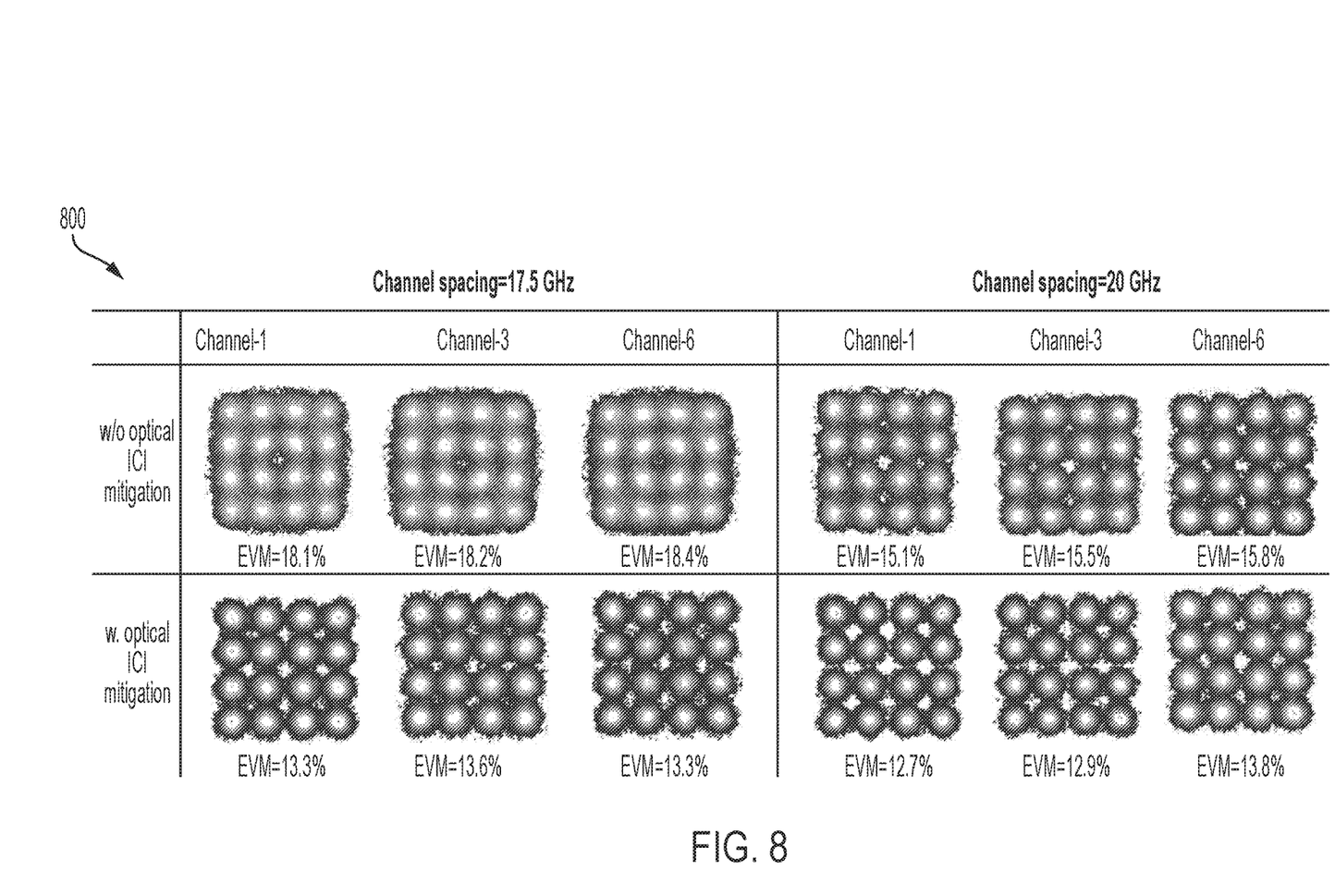
FIG. 8 shows constellation diagrams illustrating resulting outputs of the experimental system of FIG. 4 using 16-QAM signals according to an embodiment of the present disclosure.

To further illustrate the performance of the proposed ICI mitigation scheme for WDM channels, a different format of the modulation was considered. The set of even and odd channels were, in a new experiment, modulated with 16-QAM data. FIG. 8 illustrates constellation diagrams 800 corresponding to channels 1, 3, and 6 of the experimental setup of FIG. 4, with and without the optical ICI mitigation method, under channel spacings of 17.5 GHz and 20 GHz. The constellation diagrams for a channel spacing of 25 GHz are not shown here because the ICI mitigation is again insignificant for a $\Delta f$ larger than baud rate. Like QPSK constellation diagrams of the overlapped channels, the EVMs for 16-QAM signals are also generally reduced, which illustrates possible modulation transparency of the proposed ICI mitigation scheme. The EVMs for all 16-QAM channels of the WDM system with channel spacing of 17.5 GHz are reduced by almost 28%.

Figure 9:
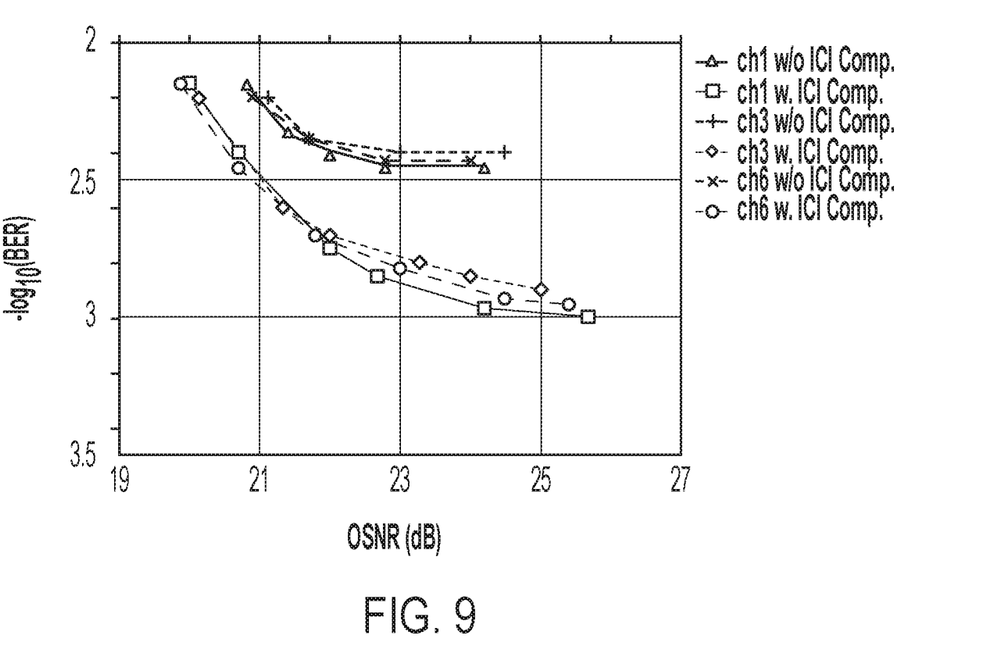
FIG. 9 is a graph illustrating bit error rate of the resulting outputs of the experimental system of FIG. 4 using 16-QAM signals according to an embodiment of the present disclosure.

FIG. 9 is a graph 900 illustrating the BER results of channels 1, 3, and 6 modulated by 16-QAM data. In this case, the channel spacing is 17.5 GHz. The 16-QAM channels are more prone to the destructive effect of ICI than QPSK channels. Therefore, the BER versus OSNR curves of the QAM signals without ICI compensation fail to retain their linear trends, for a BER value around $10^{-2.5}$ and greater. Again, a similar performance for ICI mitigation of odd and even channels is observed.

The above disclosure presents systems and methods for optical mitigation of ICI of multiple spectrally overlapped optical data channels, as well as experiments illustrating the positive results. The method is based on a cascade of conjugate wave generations with phase, amplitude, and delay adjustments. For ICI mitigation using this method, individual detection and channel spacing estimation is not required, and the ICI of all channels can be mitigated simultaneously. The system performance was assessed for multiple spectrally overlapped 20 Gbaud QPSK and 16-QAM data channels. The similar performance of the method for both QPSK and 16-QAM channels shows the potential modulation transparency of the scheme. The BERs are measured for 20 Gbaud signals and under different channel overlapping (spacing) conditions inducing different ICIs. After optical ICI mitigation, a reduction of almost 4 dB is obtained in the required OSNR to achieve a BER of $10^{-3}$ for 20 Gbaud QPSK signals with a channel spacing of 17.5 GHz. The optical ICI compensation scheme has also been used for an overlapped WDM system of a 20 Gbaud 16-QAM signals with channel spacings of 17.5 GHz and 20 GHz. The EVMs for the 16-QAM channels of a WDM system with channel spacing of 17.5 GHz are reduced by almost 28%.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for all-optical reduction of inter-channel crosstalk for spectrally overlapped optical signals for maximizing utilization of an available spectrum, comprising:
   receiving a plurality of spectrally overlapped optical signals modulated with data, the plurality of spectrally overlapped optical signals including odd signals spectrally interleaved with even signals;
   generating conjugate copies of each of the plurality of optical signals using non-linear optics;
   selecting the conjugate copies and adjusting an amplitude, a phase, and a delay of the conjugate copies; and
   performing inter-channel interference (ICI) compensation on the spectrally overlapped optical signals in an optical domain by adding the adjusted conjugate copies to the spectrally overlapped optical signals,
   wherein performing the ICI compensation includes:
      non-linear mixing, using two non-linear waveguides, the conjugate copies of crosstalk signals with at least one of the odd signals or the even signals to reduce the inter-channel crosstalk of the at least one of the odd signals or the even signals to a considerable level; and
      adjusting, using a programmable filter, the at least one of the odd signals or the even signals, and
   wherein performing the ICI compensation further includes additional reduction of inter-channel crosstalk by:
      applying, using the programmable filter, new optimal coefficients and delays to the conjugate copies of the crosstalk of the at least one of the odd signals or the even signals to generate adjusted crosstalk signals; and
      non-linear mixing, using at least one of the two non-linear waveguides, the adjusted conjugate copies of the crosstalk signals with the at least one of the odd signals or the even signals to further reduce the inter-channel crosstalk.

2. The method of claim 1 wherein the conjugate copies of the even signals are selected to reduce crosstalk for the odd signals and the conjugate copies of the odd signals are selected to reduce crosstalk for the even signals using at least one programmable filter.

3. The method of claim 1 wherein the non-linear optics includes a periodically poled lithium niobate (PPLN) waveguide, and the programmable filter includes a liquid crystal on silicon (LCoS) filter.

4. The method of claim 1 wherein generating the conjugate copies of each of the plurality of optical signals is performed using non-linear mixing in a first non-linear waveguide.

5. The method of claim 1 wherein the ICI compensation avoids use of multi-channel detection and channel spacing estimation due to use of frequency locked optical wave mixing.

6. The method of claim 1 wherein the inter-channel crosstalk of all signals in a plurality of signals is reduced simultaneously such that separate iterations are avoided for any channel other than a target channel.

7. The method of claim 1 wherein each step of the method is performed entirely in the optical domain without conversion to an electrical domain and without digital signal processing (DSP).

8. The method of claim 1 wherein the method is reconfigurable and tunable regarding baud rate, channel spacing, modulation format, and a quantity of signals.

9. The method of claim 1 wherein a crosstalk reduction for a modulation format of quadrature phase shift keying (QPSK) provides an improvement of at least 4 decibels of optical signal to noise ratio (OSNR), providing increased power savings for a transmitter.

10. The method of claim 1, wherein the ICI compensation provides a reduced bit error rate at same optical signal to noise ratio (OSNR) values for different channel spacings.

11. A method for reducing inter-channel crosstalk for optical signals, comprising:
   receiving a plurality of spectrally overlapped optical signals each carrying data on an optical bandwidth, the plurality of optical signals including odd signals interleaved with even signals;
   generating a conjugate copy of the plurality of optical signals using non-linear optics; and
   performing, using two non-linear elements and two wavelength selective elements, inter-channel interference (ICI) compensation on all channels in the optical domain to reduce the inter-channel crosstalk using the conjugate copy of the plurality of optical signals, and
   wherein performing the ICI compensation further includes adjusting, using at least one of the two wavelength selective elements and on the first branch, an amplitude and a phase of the conjugate copy of the odd signals to reduce the crosstalk on an even signal.

12. The method of claim 11 wherein the plurality of optical signals is divided into two branches using a first programmable filter such that the ICI compensation is performed on the even signals on a first branch and the odd signals on a second branch.

13. A system for reducing inter-channel crosstalk for optical signals comprising:
   an overlapped optical wavelength division multiplexing (WDM) system including a plurality of optical signals including odd signals interleaved with even signals;
   a first non-linear waveguide configured to generate a conjugate copy of the plurality of optical signals;
   a first two-port programmable filter configured to divide and adjust the plurality of optical signals into two branches; and
   a second non-linear waveguide, a third non-linear waveguide, and a second programmable filter located downstream from the first two-port programmable filter in a first branch of the two branches and configured to perform inter-channel interference (ICI) compensation on the even signals in the optical domain to reduce the inter-channel crosstalk using the conjugate copy of the plurality of optical signals.

14. The system of claim 13 wherein the second non-linear waveguide, the third non-linear waveguide, and the second programmable filter are further configured to perform the ICI compensation without use of multi-channel detection and without channel spacing estimation due to use of frequency locked optical conjugate signals.

15. The system of claim 13 wherein the inter-channel crosstalk of all signals is reduced simultaneously such that separate iterations are avoided for any channel other than a target channel.

* * * * *

UNITED STATES PATENT AND TRADEMARK OFFICE
CERTIFICATE OF CORRECTION

| | | |
|---|---|---|
| PATENT NO. | : 11,652,556 B2 | Page 1 of 1 |
| APPLICATION NO. | : 16/979157 | |
| DATED | : May 16, 2023 | |
| INVENTOR(S) | : Fatemeh Alishahi et al. | |

It is certified that error appears in the above-identified patent and that said Letters Patent is hereby corrected as shown below:

In the Specification

Column 1, Lines 16-24:
The "STATEMENT REGARDING GOVERNMENT RIGHTS" should read as follows:
This invention was made with Government support under grant number 70NANB16H012 awarded by the National Institute of Standards and Technology. The Government has certain rights in the invention.

Signed and Sealed this
Eleventh Day of November, 2025

John A. Squires
*Director of the United States Patent and Trademark Office*